Sept. 19, 1950      F. WHITWORTH      2,522,732
GAS PRESSURE REGULATOR VALVE
Filed Feb. 6, 1946
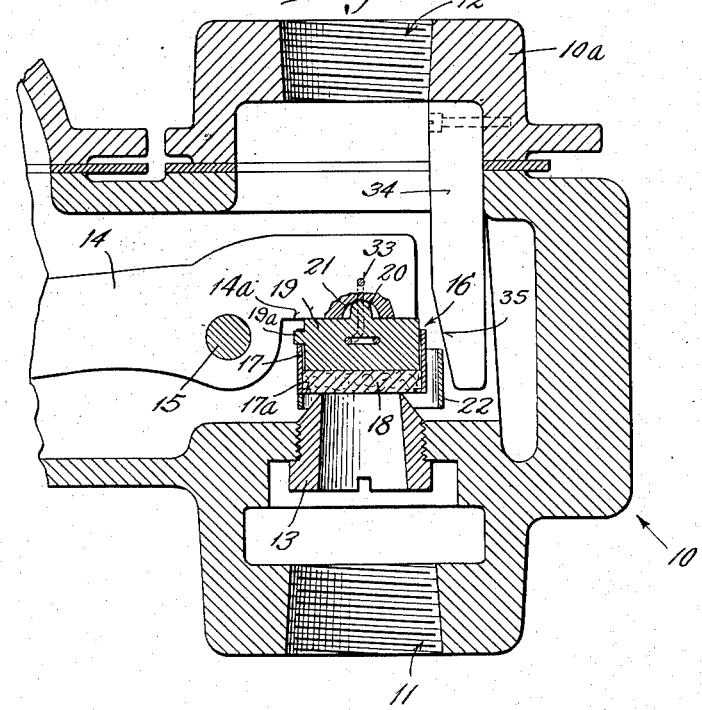
INVENTOR
*Fairchild Whitworth*
BY
*Johnson, Kline & Hensel*
ATTORNEYS Patented Sept. 19, 1950

2,522,732

UNITED STATES PATENT OFFICE 2,522,732

GAS PRESSURE REGULATOR VALVE

Fairchild Whitworth, Bridgeport, Conn., assignor to Sprague Meter Company, Bridgeport, Conn., a corporation of Connecticut Application February 6, 1946, Serial No. 645,768

10 Claims. (Cl. 50—26)

This invention relates to improvements in gas regulators of the type commonly interposed in gas distribution lines for maintaining the gas pressure substantially constant, despite variations in the rate of flow of gas through the line.

Regulators of the aforesaid type normally include a valve controlling the inlet line of the regulator, pressure-responsive means such as a diaphragm subject to the gas pressure on the outlet side of the regulator and counterbalanced by a spring, so that displacement of the diaphragm is substantially proportional to the outlet gas pressure, and a lever mechanism connecting the pressure-responsive means with the valve so as to open the valve when the outlet pressure decreases and to close or throttle the flow of gas when the outlet pressure increases, thus re-establishing the desired pressure in the outlet line.

Regulators of the aforesaid type usually comprise an inlet orifice serving as a valve seat, opening into a diaphragm chamber, and an outlet connection above the orifice, substantially coaxial therewith so that a stream of gas can flow through the regulator with minimum deflection. A valve-operating lever extends between the inlet orifice and outlet opening from a fulcrum at one side of the orifice, and carries a plug-like valve member adapted to close the inlet orifice.

Since the valve is subject to deterioration from corrosion, moisture and accumulation of dirt and tar, it is desirable to attach the valve to the lever arm in such a manner that it can be readily detached and removed through a suitable opening in the regulator casing, provided with a cover or seal. Means for fastening the valve to the lever is preferably so constructed that the valve is retained against such lateral displacement as would move the valve out of line with the inlet orifice, while at the same time permitting limited angular displacement relative to the lever in order that the valve may seat properly on the orifice. Since the attachment means for the valve is likewise subject to deterioration, it is desirable that it should be readily removable from the valve as well as from the lever for replacement, cleaning or repair.

In some cases, the valve includes a guide for the gas issuing from the orifice, adapted to direct the gas around the valve toward the outlet opening, thus avoiding undue loss in pressure from deflection of the gas by the valve. One form of construction including a guide or deflector for the gas is shown in United States Patent No. 2,215,419, to Cheeseman, wherein a cylindrical valve is provided with a cylindrical skirt extending below the edge of the orifice and spaced therefrom so that it forms with the cylindrical surface of the valve a channel parallel to the axis of the orifice, through which the gas flows toward the outlet of the regulator. In the case of valves of this type, it is advantageous to maintain the valve and its deflector member substantially parallel to the axis of the inlet orifice when the lever raises the valve from the orifice. Accordingly, means for attaching the valve to the lever arm is preferably arranged such that the valve can tilt relative to the lever arm so that its axis will remain substantially parallel to the axis of the inlet orifice.

Among the objects of this invention is the provision of means for attaching a valve for a gas pressure regulator of the aforesaid type to a lever arm, said means being of simple and economical construction, the valve being retained thereby against substantial lateral displacement while at the same time permitting limited angular displacement of the valve so that it may seat properly on the orifice, and if desired can be tilted relative to the lever, so as to maintain its axis parallel to the axis of the orifice.

A further object of the invention is to provide means for securing the valve to a lever arm in such a manner that the valve can be readily detached from the lever arm, and so that the attachment means can be readily removed from the valve, the attachment means and valve being so constructed that they can be assembled only in the proper manner without trial and error and without inspection of the lever arm.

A further object is the provision of simple guide means for maintaining a valve which is attached to the lever of a regulator by fastening means of this invention, substantially parallel to the axis of the orifice during movement of the valve away from the orifice.

In accomplishing the foregoing objects in accordance with my invention, the valve of a gas pressure regulator is suspended from the lever arm over the valve seat or inlet orifice by means of a resilient hanger, advantageously formed from a single piece of wire in the form of a U, having a straight arm adapted to slide through a hole in the side of the lever arm (i. e. a hole parallel to the fulcrum of the lever), the other arm of the U being bent into the form of a loop preferably lying in a plane normal to the plane of the U, adapted to slide through a transverse central slot through the valve, so that the hanger can be readily removed from the valve as well as detached from the lever. The valve-engaging loop and slot are preferably constructed with stop means, limiting the extent of insertion of the loop through the slot and preventing mistaken insertion of the loop from the opposite end of the slot, so that trial and error in assembly of the valve and the hanger is avoided. The valve is yieldably retained against casual substantial lateral displacement by inter-engaging means on the upper surface of the valve and the lower surface of the lever arm, for example a boss and a socket, the hanger resiliently urging the boss into engagement with the socket. If desired, fixed guide means can be provided for tilting the valve relative to the lever when the latter raises the valve from its seat, in such a manner as to maintain the axis of the valve substantially parallel to the axis of the inlet orifice.

Other objects and advantages of the invention will hereinafter appear from the following description, taken together with the accompanying drawings wherein:

Figure 1 is a central vertical section of the valve and its housing, including part of the lever, in a gas pressure regulator of the aforesaid type, including the novel attachment and guide means of my invention.

Fig. 2 is a fragmentary section similar to Fig. 1, showing the valve in open position.

Fig. 3 is a detail in plan elevation of the valve assembled with the attachment member of my invention.

Fig. 4 is a vertical section of the valve and suspension member of Fig. 3.

In Fig. 1 there is shown a valve housing 10 of a gas regulator including a threaded inlet 11 at its base, in alignment with a threaded outlet 12 at the top, and including a removable orifice 13 supported by the housing above the inlet 11, the upper edge of the orifice forming a seat for a valve. A lever 14, having as its fulcrum a transverse pin 15, raised and lowered by a conventional spring-pressed diaphragm or similar pressure-responsive means, subject to the gas pressure on the outlet side of the orifice 13, is provided for operating a valve.

The valve 16 comprises, for example, a cylindrical metal shell 17 having an internal flange 17a at its lower edge for retaining a disk 18 of suitable material adapted to engage the valve seat formed by the orifice 13, in order to seal the inlet against flow of gas through the regulator. The shell 17 likewise encloses a cylindrical plug 19 above the disk 18, having a boss 20 at the center of its upper surface adapted to fit loosely into a socket 21 on the lower surface of the lever 14 so as to position the valve above the orifice 13. The valve preferably includes guide means for directing the flow of gas from the orifice 13 around the valve toward the outlet 12, such guide means as illustrated comprising a skirt 22 encircling the shell 17, spaced therefrom, and extending substantially below the flange 17a. The skirt 22 is partly cylindrical with its ends 22a bent inward and attached to the shell 17 on the side of the valve nearest the fulcrum of the lever. The lower surface 14a of the lever 14 is preferably constructed so as to conform to, or lie substantially flat against the upper surface of plug 19 when the disk 18 is seated on the orifice 13.

The novel suspension means in accordance with this invention comprises a resilient hanger 23 advantageously constructed of a spring wire, bent into the form of a U as shown in Fig. 4, one arm 24 being straight and the other arm 25 of the U having a reverse bend forming a loop 26 with substantially parallel sides 27 and 28 preferably lying in a plane normal to the plane of the U. An S bend 29 is preferably formed at the base of loop 26 so as to offset the loop laterally, enough to align its center with the plane of the U.

For the purpose of attaching the hanger to valve 16 a transverse slot 30 is formed in the plug 19 and shell 17, the slot being preferably parallel to the inwardly bent ends 22a of the gas deflecting skirt 22, so as to be parallel to the fulcrum of the lever 14 when the valve is assembled with the lever. The hanger 23 is assembled with the valve by sliding the loop 26 through slot 30 with the straight arm 24 of the hanger extending over the top of the valve. The plug 19 is preferably keyed to the shell 17 to insure assembly of these parts in only one desired manner, and proper registering of the portions of slot 30 in the shell and plug, respectively, when these parts are assembled, by forming a notch at the upper edge of shell 17, and providing a projection or key 19a on the plug, fitting into said notch.

The plug 19 is preferably constructed to be removable from the shell 17, and is held in assembly with the shell solely by loop 26 of hanger 23 passing through slot 30 which extends through the plug and shell. Thus, the plug can be readily separated from the shell upon removal of hanger 23 from slot 30, whereupon disk 18 can also be removed from the top of the shell, permitting convenient replacement or repair of any of the parts of the valve.

In order to insure proper assembly of the hanger with the valve so that both can be attached to the lever 14 to hang in the desired position without trial and error, one side of the slot 30 in the plug 19 is advantageously widened at one side as shown at 31 for a short distance inward from the lateral surface of the plug, adjacent the end of the slot into which the loop is to be inserted. A projection 32 is formed at one side of loop 26 by a bend in the wire, adapted to fit into the widened portion 31 of slot 30 upon insertion of the loop therein. The projection 32 prevents the mistaken insertion of the loop from the wrong end of the slot, and limits the extent of insertion to the desired distance by engagement with the shoulder 31a at the inner end of the widened part 31 of slot 30. The aperture in shell 19 forming the end of slot 30 adjacent the widened portion 31 is preferably narrower than said widened portion, e. g. it may be of the same width as the corresponding aperture at the other side of the shell, the projection 32 on loop 26 thereby preventing casual displacement of the loop from slot 30. The sides 27 and 28 of the loop can be bent apart slightly before insertion in slot 30 so that they press resiliently against the sides of the slot, thus offering increased frictional resistance to displacement of the loop in the slot.

In assembling the valve and hanger, disk 18 is inserted in shell 17 until it seats against the flange 17a. The plug 19 is then inserted in the shell on top of the disk, with key 19a engaging the corresponding notch in the upper edge of the shell. Loop 26 of hanger is then inserted in slot 30 from the end adjacent widened portion 31, the arms 27 and 28 of the loop being flexed together to permit projection 32 to enter the slot. When the arms of the loop are released, they spring apart with projection 32 seated in widened portion 31 of the slot. Erroneous insertion of the loop from the opposite end of slot 30 would become apparent at once by reason of failure of projection 32 to seat in widened portion 31 of the slot, thus preventing inwardly flexed arms 27 and 28 of the loop from returning to normal parallel relation. The parts of the valve and hanger can be readily disassembled by reversing the assembly operations described above.

For the purpose of securing the hanger and valve to lever 14, a hole 33 is bored laterally through the lever 14 (i. e. parallel to the fulcrum axis) above the socket 21, the hole being adapted to receive arm 24 of hanger 23. After assembly of the valve with the hanger, the valve can readily be attached to the end of the lever arm merely by sliding the arm 24 of the hanger through the hole 33 until the boss 20 on the valve slips into the socket 21 at the center of the lever 14. A conventional aperture (not shown) with a removable cover plate is provided at the side of the housing 10 from which the valve and hanger are to be inserted or removed, thus permitting installation and/or removal of the valve and hanger when the cover plate is removed, with utmost convenience.

It will be observed that the valve 16 is resiliently urged by the hanger 23 into contact with the lever 14, thus yieldably maintaining boss 20 and socket 21 in engagement and preventing substantial lateral displacement of the valve relative to the lever, from accidental causes. The resiliency of the hanger nevertheless permits the valve to tilt slightly relative to the lever 14, in order to seat properly on the edge of the inlet orifice 13.

If desired, a fixed guide member 34 can be provided on the interior of the housing for maintaining the valve and its guide skirt 22 against substantial angular displacement relative to orifice 13 when the lever 14 raises the valve 16 from the orifice. The fixed guide member 34 may be advantageously fastened to a removable portion of the housing 10 (for example the upper end 10a of the housing in which outlet opening 12 is formed) so as to extend downward opposite the end of lever 14, its guide surface 35 contacting the outer upper edge of the skirt 22 at a point furthermost removed from the lever fulcrum 15, during movement of the valve away from the orifice 13. The guide surface 35 is advantageously in the form of an inclined plane, substantially normal to a radius extending from the center of the fulcrum 15 through the point 36 at which the upper edge of the valve nearest the fulcrum contacts the lever 14, the lever being in a position corresponding to the average rate of flow to be maintained. When the lever raises the valve, the outer edge of skirt 22 slides upward along the guide surface 35 of guide member 34, causing the valve to pivot about the point 36 and displacing the top of the valve from the undersurface of the lever. The pivoting action maintains the valve skirt 22 substantially parallel to the axis or direction of flow of gas from orifice 13 to outlet 12. The resilient hanger 23 of my invention permits the valve to tilt away from the lever 14 as it slides along the guide surface 35, and retracts the valve into contact with the lever when the latter moves the valve downward toward orifice 13.

It will be observed that the hanger in accordance with my invention can be cheaply and economically constructed from a single piece of wire and can be readily assembled with the valve as well as the lever, and can likewise be removed therefrom for replacement or repair with utmost convenience.

Variations and modifications may be made within the scope of this invention and portions of the improvements may be used without others.

I claim:

1. In a gas pressure regulator of the type described comprising a valve member, a lever for moving the valve member toward and away from an inlet orifice, and interengageable means on the lever and on the valve member for retaining the valve member against substantial lateral displacement relative to the lever, means for attaching said valve member to said lever in a predetermined rotative position, comprising an aperture in said lever, a parallel aperture in said valve member, and a resilient U-shaped hanger, one arm of said hanger extending slidably through the aperture in the lever and the other arm extending through the aperture in the valve, the latter arm having a lateral projection thereon, and stop means within the aperture in said valve member cooperating with said projection to limit the extent of insertion of the arm of the hanger through said aperture in the valve member and to prevent insertion of the hanger arm from the opposite end of said aperture whereby the valve can only be mounted on the lever in said position, said hanger resiliently urging the retaining means on said lever and valve member into engagement.

2. In a gas pressure regulator of the type described comprising a valve member, a lever for moving the valve member toward and away from an inlet orifice, and interengageable means on the lever and valve member for retaining the valve member against substantial lateral displacement relative to the lever, means attaching the valve member to said lever comprising a lateral aperture in said lever, a parallel transverse slot in said valve member, and a resilient U-shaped hanger, one arm of said hanger extending slidably through the aperture in the valve of the lever, and the other arm of said hanger being broadened to fit, and slidably extending through, a transverse slot in said valve member, the latter arm of said hanger having a lateral projection at one side thereof and the slot in said valve member having a widened portion extending a short distance inward from one end to receive said projection, the projection limiting the extent of insertion of the broadened arm of the hanger into said slot preventing rotation of the valve on said arm, and said widened portion of the slot indicating the proper end thereof for insertion of the hanger, said hanger resiliently urging the interengageable retaining means of said lever and valve into engagement.

3. The combination, in a gas regulator of the type described, of a valve member having a seat-engaging surface and having a transverse passage through the valve member for receiving a hanger, said passage comprising a widened portion adjacent one end; a hanger for attaching said valve member to a lever, comprising lever-engaging means, and an arm slidably inserted through the transverse passage of said valve member, said arm being widened adjacent its inner end to correspond to the widened portion of said passage, so as to permit insertion of the arm in said passage from the widened end thereof, but to prevent insertion from the opposite end of the passage.

4. The combination, in a gas regulator of the type described, of a valve member having a seat-engaging surface and having a transverse slot through the valve member for receiving a hanger, said slot having a widened portion extending a short distance inward from one end thereof; and a hanger for attaching said valve member to a lever, comprising lever-engaging means, and a widened arm slidably inserted through the transverse slot of said valve member, said arm having a lateral projection adjacent its inner end corresponding to the widened portion of said slot, so as to permit insertion of the arm into said slot from the widened end thereof and limiting the extent of insertion of said arm, said projection preventing insertion of the arm from the opposite end of the slot.

5. In a gas pressure regulator of the type described, a lever for moving a valve toward and away from a valve seat, a valve carried by said lever; means for retaining said valve against substantial lateral displacement relative to the lever; resilient means urging the valve against the lever; and fixed guide means engaging the outer edge of the valve during displacement thereof by the lever from said valve seat, said guide means tilting the valve relative to the lever during movement of the lever about its fulcrum, so as to maintain the axis of the valve substantially parallel to the axis of the valve seat.

6. In a gas pressure regulator of the type described, a lever for moving a valve toward and away from a valve seat; a valve carried by said lever, including guide means for directing the flow of gas past the valve; means for retaining said valve against substantial lateral displacement relative to the lever, resilient means urging the valve against the lever; and fixed guide means engaging the outer edge of the valve during displacement thereof by the lever from said valve seat, said guide means tilting the valve relative to the lever during movement of the lever about its fulcrum so as to maintain the axis of the valve substantially parallel to the axis of the valve seat.

7. In a gas pressure regulator of the type described, a lever for moving a valve toward and away from a valve seat; a valve carried by said lever; means for retaining said valve against substantial lateral displacement relative to the lever; resilient means urging the valve into contact with the lever; and fixed guide means comprising an inclined plane surface normal to a radius of the fulcrum of said lever and passing through the point of contact of said valve with the lever nearest said fulcrum when the valve is in a normal displaced position from said valve seat, said inclined plane engaging the outer edge of said valve upon displacement of the valve from the valve seat.

8. In a gas pressure regulator of the type described, a lever for moving a valve toward and away from a valve seat; a valve carried by said lever; means for retaining said valve against substantial lateral displacement relative to the lever; a resilient hanger secured to said valve member and slidably engaging an aperture in the side of said lever for attachment and removal of the valve member, said hanger resiliently urging said valve into contact with the lever; and a fixed guide member comprising an inclined plane surface normal to a radius from the fulcrum of said lever and passing through the point of contact of said valve with said lever nearest said fulcrum when the valve is in a normal displaced position from its valve seat, said inclined plane engaging the outer edge of said valve upon displacement of the valve from its valve seat.

9. In a gas pressure regulator of the type described, a valve member comprising a shell having a flange at the lower end, a valve disk positioned within said shell and engaging said flange, and a closure plug disposed in the shell above the disk, the shell having a slot in the wall thereof and the plug having a slot therein in alignment with the slot in the shell; a lever for moving the valve member toward and away from an inlet orifice; interengageable means on the lever and on the valve member for retaining the valve member against substantial lateral displacement relative to the lever; and means for attaching said valve member to said lever comprising a transversely extending aperture in said lever, and a resilient U-shaped hanger, one arm of said hanger extending slidably through the aperture in the lever and the other arm extending slidably through the slot in the shell of the valve member and into the slot in the plug, said arm maintaining the plug disk and shell in assembled relation and said hanger yieldably urging the interengageable retaining means on said lever and valve member into engagement.

10. In a gas pressure regulator of the type described, a valve member comprising a shell having a flange at the lower end, a valve disk positioned within said shell and engaging said flange, and a closure plug disposed in the shell above the disk, the shell having a slot in the wall thereof and the plug having a slot therein in alignment with the slot in the shell and having a portion wider than the slot in the shell; a lever for moving the valve member toward and away from an inlet orifice; interengageable means on the lever and on the valve member for retaining the valve member against substantial lateral displacement relative to the lever; and means for attaching said valve member to said lever comprising a transversely extending aperture in said lever, and a resilient U-shaped hanger, one arm of said hanger extending slidably through the aperture in the lever and the other arm extending slidably through the slot in the shell of the valve member and into the slot in the plug and having a portion disposed in the wider portion of said slot to maintain the plug and shell in assembled relation.

FAIRCHILD WHITWORTH.

REFERENCES CITED

The following references are of record in the file of this patent:

UNITED STATES PATENTS

| Number | Name | Date |
|---|---|---|
| 1,950,120 | McKee | Mar. 6, 1934 |
| 2,038,013 | Temple | Apr. 21, 1936 |
| 2,147,163 | Jimerson | Feb. 14, 1939 |
| 2,236,130 | Niesemann | Feb. 18, 1941 |

FOREIGN PATENTS

| Number | Country | Date |
|---|---|---|
| 13,788 | Great Britain | June 14, 1907 |